3,311,654
PROCESS FOR THE PREPARATION OF
ORGANIC ISOCYANATES
Adnan A. R. Sayigh, New Haven, and James N. Tilley, Cheshire, Conn., assignors to The Upjohn Company, Kalamazoo, Mich., a corporation of Delaware
No Drawing. Filed June 4, 1963, Ser. No. 285,206
18 Claims. (Cl. 260—465)

This invention relates to novel processes and to novel compositions of matter. In particular, this invention relates to novel processes for the preparation of organic isocyanates, including monoisocyanates, diisocyanates, and higher polyisocyanates, and to novel secondary carbamoyl chlorides useful as reactants for preparing said isocyanates.

One aspect of this invention involves preparing an isocyanate, for example, a monoisocyanate, a diisocyanate, or a higher polyisocyanate, by heating a secondary carbamoyl chloride reactant containing at least one moiety with the formula:

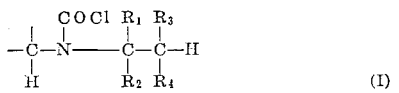  (I)

wherein $R_1$ and $R_2$ are lower alkyl, and wherein $R_3$ and $R_4$ are selected from the group consisting of hydrogen and lower alkyl, in the range 50° to 250° C. Examples of lower alkyl are methyl, ethy, propyl, butyl, pentyl, hexyl, and isomeric forms thereof. By this process, each secondary carbamoyl chloride moiety I in said secondary carbamoyl chloride reactant is transformed to an isocyanato-containing moiety with the formula:

  (II)

The residuary carbon and hydrogen atoms and the chlorine atom of each moiety I are transformed by this process to hydrogen chloride plus an alkene, for example, that with the formula:

  (III)

wherein $R_1$, $R_2$, $R_3$, and $R_4$ are as defined above, or to an alkyl chloride, for example, that with the formula:

  (IV)

wherein $R_1$, $R_2$, $R_3$, and $R_4$ are as defined above, or to a mixture of all of these. One or more alkenes and/or alkyl chlorides isomeric with the above can also be formed.

Compounds containing one or more secondary carbamoyl chloride moieties of Formula I are novel in the art. Another aspect of this invention involves preparing these novel intermediates by reacting phosgene with a secondary amine reactant containing at least one moiety with the formula:

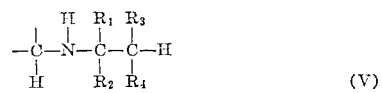  (V)

wherein $R_1$, $R_2$, $R_3$, and $R_4$ are as defined above, such moiety preferably but not necessarily being the sole moiety in said secondary amine reactant which is reactive with phosgene. By this process, each secondary amine moiety V is transformed to the corresponding secondary carbamoyl chloride moiety I. When defining Formula V moieties as the sole moieties of a secondary amine reactant which are reactive with phosgene, it is intended that all other moieties of said reactant will be unreactive with phosgene. The term "unreactive with phosgene" is intended to mean that in this phosgenation reaction, the probability that the structure of any moiety of said secondary amine reactant other than a Formula V moiety will be altered by interaction with phosgene is less than 0.1 or, conversely, the probability that these moieties will survive the phosgenation reaction unchanged is at least 0.9. It is also intended that the term "unreactive with phosgene" be evaluated in view of the reaction conditions set forth hereinafter as preferred for causing phosgenation of each moiety V to a moiety I, and not in view of some other reaction conditions, for example, at a reaction temperature substantially higher than that set forth hereinafter or in the presence of a catalyst, for example, aluminum chloride or ferric chloride.

Still another aspect of this invention involves the unitary multi-step process comprising the steps, (1) reacting phosgene with a secondary amine reactant containing at least one moiety with the Formula V, wherein $R_1$, $R_2$, $R_3$, and $R_4$ are as defined above, such moiety preferably but not necessarily being the sole moiety in said secondary amine reactant which is reactive with phosgene, and (2) heating the secondary carbamoyl chloride product from step (1) in the range 50° to 250° C. By this unitary process, an organic isocyanate with at least one moiety of Formula II is formed. In some instances, the secondary carbamoyl chloride product from step (1) is best isolated, or isolated and purified before using it in step (2). In other instances, the total reaction mixture from step (1) can with advantage be heated directly to form the desired organic isocyanate. In still other instances, isocyanate can be produced from secondary carbamoyl chloride as soon as the latter starts to appear in the phosgenation reaction mixture. In this last embodiment, two successive chemical transformations are accomplished in one procedural step.

Although the above described unitary multi-step process is a preferred embodiment of this invention, secondary carbamoyl chloride reactants containing one or more moieties of Formula I can also be prepared by other methods known in the art to be useful for preparing other carbamoyl chlorides, and then can be transformed by the above described novel thermal treatment to isocyanates. For example, a urethane can be treated with phosphorus oxychloride or phosphorus pentachloride [Schmidt, Ber. Deut. Chem., 36, 2459–82 (1903); Lengfeld et al., Am. Chem. J., 16, 70–8 (1894), an N,N-disubstituted formamide can be chlorinated by treatment with thionyl chloride [Schneider et al., Ann. 615, 34–42 (1958)], or a disubstituted urea can be reacted with hydrogen chloride [Slocombe et al., U.S. Patent 2,773,086]. In each instance, a carbamoyl chloride is obtained. Di- and higher polycarbamoyl chlorides can also be prepared by these methods.

It is known in the art to prepare a limited class of secondary carbamoyl chlorides by reacting secondary amines with phosgene [Price, J. Chem. Soc. 3230–3 (1926); Slocombe et al., J. Am. Chem. Soc. 72, 1888–91 (1950); Boon, J. Chem. Soc. 307–18 (1947); Boon, U.S. Patents 2,398,283 and 2,409,829; Weijlard et al., U.S. Patent 2,642,450; Houben-Weyl, "Methoden der Organischen Chemie," 4th Ed., vol. 8, 117–8 (1952)]. However, in no instance has a secondary amine with a tertiary alkyl attached to the nitrogen been transformed to a secondary carbamoyl chloride by reaction with phosgene. Here, "tertiary alkyl" is intended to mean an alkyl in which the carbon atom attached to nitrogen is not attached directly to any hydrogen atoms but only to other carbon atoms.

Those few secondary carbamoyl chlorides which have been prepared by phosgenation of secondary amines are usually rather stable to heat, for example, up to their carbonization temperature in the absence of air or up to their burning temperature in the presence of air. On the other hand, it is known that attempts to distill certain of these prior art secondary carbamoyl chlorides lead to decomposition with "loss of carbonyl chloride and formation of what appeared to be linear polyureas which could not be purified" [Boon, J. Chem. Soc. 309 (1947)].

We have now made the surprising discovery that isocyanates, including monoisocyanates, diisocyanates, and higher polyisocyanates, are produced easily, and in high yield and high state of purity, by mild thermal treatment of the novel secondary carbamoyl chlorides of this invention, i.e., compounds containing one or more moieties of the formula:

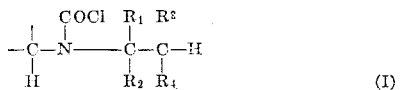
(I)

wherein $R_1$, $R_2$, $R_3$, and $R_4$ are as defined above. Each such Formula I moiety is thereby transformed to a moiety of the formula:

(II)

Apparently and unexpectedly, when $R_1$ and $R_2$ are both lower alkyl and when a hydrogen atom is present on the adjacent carbon atom, both as in Formula I, the right-hand nitrogen-carbon bond is readily cleaved by relatively mild thermal treatment.

It is essential that the carbon atom attached to the left side of the nitrogen atom in the Formula I moiety be bonded to at least one hydrogen atom as in Formula I. Preferably, this carbon atom should be bonded to two hydrogen atoms as in the moiety formula:

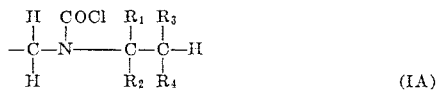
(IA)

wherein $R_1$, $R_2$, $R_3$, and $R_4$ are as defined above. Such Formula IA moieties are particularly easily transformed to isocyanate moieties of the formula:

(IIA)

If the carbon atom attached to the left side of the nitrogen atom in Formula I is tertiary, i.e., is bonded to no hydrogen atoms but only to other carbon atoms, cleavage of either carbon-nitrogen bond in a Formula I moiety is likely to occur, particularly if there is a hydrogen atom attached to the carbon atom vicinal to the left-hand carbon atom. In that event, a mixture of isocyanates is likely to be obtained by thermal treatment. Such carbamoyl chlorides and their thermal treatment are not within the scope of this invention.

Some of the isocyanates within the scope of those which can be prepared according to this invention are known in the art. These known isocyanates have often been prepared by phosgenation of primary amines [Saunders et al., "Polyurethanes: Chemistry and Technology, Part I. Chemistry," Interscience Publishers, New York, N.Y., 17–22 (1962); Houben-Weyl, "Methoden der Organischen Chemie," 4th Ed., vol. 8, 120–4 (1952); Siefken, Ann. 562, 75–136 (1949); Saunders et al., Chem. Rev., 43, 203–5 (1948)]. In this old phosgenation process, the corresponding primary carbamoyl chloride is usually considered to be an intermediate, and is sometimes isolated and subsequently transformed, for example, by heating, to the desired isocyanate. The primary amines, especially the diamines and higher polyamines, required for this process are, in many instances, relatively expensive and difficult to obtain in the necessary state of purity. Because comparable secondary amines which are useful to prepare novel secondary carbamoyl chloride intermediates of this invention are usually readily available in a relatively high state of purity, there is often substantial advantage in preparing isocyanates according to this invention rather than by one of the prior art processes.

A wide variety of secondary carbamoyl chloride reactants can be used to prepare an equally wide variety of organic isocyanates according to this invention. For example, the secondary carbamoyl chloride reactant can be entirely aliphatic, i.e., free of ring moities, or it can be, at least in part, alicyclic, aromatic, heterocyclic, or any combination of these. The only limitation with regard to the suitability of a secondary carbamoyl chloride reactant for this purpose, other than the structural limitation concerning the Formula I carbamoyl chloride moities discussed above, is that said reactant not undergo gross decomposition during the relatively mild thermal treatment necessary to transform each Formula I moiety to a Formula II isocyanato-containing moiety. By the term "gross decomposition" is meant deep-seated structural change involving substantially complete breakdown of the secondary carbamoyl chloride reactant into substantially smaller molecular and/or atomic fragments. As will be apparent to those skilled in the art, the vast majority of organic compounds containing one or more Formula I moieties will not undergo such a gross decomposition within the range 50° to 250° C., the exceptions being the relatively small number of unstable heat-sensitive organic compounds containing, for example, ozonide, azide, or peroxide moieties, or several nitro moities. It is well known that such compounds often explode when heated. When they do, they will, of course, not be suitable as reactants for the preparation of isocyanates by the novel process of this invention. On the other hand, the fact that a particular secondary carbamoyl chloride reactant undergoes relatively minor structural changes, for example, dehydration, decarboxylation, dehydrohalogenation, isomerization, and the like, while its Formula I carbamoyl chloride moieties are being transformed to Formula II isocyanato-containing moieties does not prevent that particular secondary carbamoyl chloride from being useful as a reactant in the novel process of this invention.

Although organic isocyanates containing 3, 4, 5, or more isocyanato moieties can be prepared by the novel processes of this invention, said processes are best suited for the preparation of monoisocyanates and diisocyanates. In those preferred embodiments, secondary carbamoyl chloride reactants containing one or two Formula I secondary carbamoyl chloride moieties are prepared and subjected to thermal treatment to form the desired isocyanates.

As mentioned above, when the secondary carbamoyl chloride reactant is prepared by reacting phosgene with a secondary amine reactant containing Formula V secondary amine moieties, it is preferred although not essential that said secondary amine moieties be the only parts of the secondary amine reactant which are reactive with phosgene, and that heteroatoms, substituents, and other molecular moieties be unreactive with phosgene. However, if a substituent or a heteroatom or some other part of a secondary amine reactant intended for transformation to a secondary carbamoyl chloride is reactive with phosgene, said reactant will still generally be operable in the novel processes of this invention, provided that sufficient phosgene is used to react with all reactive moieties including those of Formula V. In this less preferred circumstance, the final isocyanate will differ in structure from that of the secondary amine reactant and that of the secondary carbamoyl chloride intermediate reactant in a manner which will be dependent on the nature of whatever phosgene-reactive moieties are present in the secondary amine reactant. For example, a primary amino substituent in the secondary amine reactant is likely to be altered by phosgenation and subsequent thermal treatment so that it appears in the final isocyanate as an additional isocyanato substituent. Similarly, a hydrogen atom bonded to a heterocyclic nitrogen, for example, in a pyrrole or pyrrolidine ring, is likely to become a carbamoyl chloride moiety which will survive the final thermal treatment. Other minor structural changes caused by reaction of phosgene with reactive moieties other than those of Formula V will be obvious to those skilled in the art.

When it is desired to prepare a diisocyanate or higher polyisocyanate containing the isocyanato-substituents on vicinal aliphatic carbon atoms, it is preferred to prepare the corresponding secondary carbamoyl chloride reactant by a method other than phosgenation of the corresponding diamine. In such specific instances, the latter process tends to produce a cyclic urea rather than the desired bis[carbamoyl chloride].

With regard to the tertiary alkyl portion of a Formula I carbamoyl chloride moiety or a Formula V secondary amine moiety, i.e., that portion with the formula:

(VI)

it is preferred that $R_1$ and $R_2$ be methyl and that $R_3$ and $R_4$ be hydrogen. This particular tertiary alkyl, tert-butyl, is especially suitable as part of a Formula I or Formula V moiety because organic reactants containing such moieties are relatively easily and inexpensively prepared, and because tert-butyl in a Formula I secondary carbamoyl chloride moiety is especially easily removed by mild thermal treatment, usually appearing in the reaction product mixture as isobutylene and/or tert-butyl chloride. However, other tertiary alkyls can be present as part of a Formula I or a Formula V moiety, the only limitation being that $R_1$, $R_2$, $R_3$, and $R_4$ are as defined above. Examples of suitable tertiary alkyls other than tert-butyl are: 1,1-dimethylpropyl; 1,1,3-trimethylpropyl; 1-ethyl-1-methylpropyl; 1,1-dimethylbutyl; 1,1-dimethylpentyl; 1,1,2-trimethylbutyl; 1,1,3-trimethylbutyl; 1-ethyl-1-methylbutyl; 1,1-diethylpropyl; 1,2-dimethyl-1-ethylpropyl; 1,1-dimethylhexyl; 1,1,2-trimethylpentyl; 1,1,3-trimethylpentyl; 1,1,4-trimethylpentyl; 1-ethyl-1-methylpentyl; 1,1,2,3-tetramethylbutyl; 1,2-dimethyl-1-ethylbutyl; 1,1,3,3-tetramethylbutyl (i.e., tert-octyl); 1,3-dimethyl-1-ethylbutyl; 1,1-diethylbutyl; 1-isopropyl-1-methylbutyl; 1-methyl-1-propylbutyl; 1,1-diethyl-1-methylpropyl; 1-ethyl-1-isopropylpropyl; 1,2-dimethyl-1-isopropylpropyl; 1,1-dimethylheptyl; 1,1,2-trimethylhexyl; 1,1-diethylpentyl; 1,1-diethyl-2-methylbutyl; 1,1-dimethyloctyl; 1,1,2-trimethylheptyl; and the like. The tertiary alkyls present in a particular organic reactant need not be all alike. For example, in a particular secondary carbamoyl chloride reactant containing one moiety of Formula I, some molecules can have tertiary nonyl in the moiety and others can have tertiary decyl.

As discussed above, substantially all organic reactants containing Formula V secondary amine moieties can be used to prepare novel secondary carbamoyl chloride intermediates suitable for transformation to isocyanates, including reactants with 3, 4, 5, or more Formula V moieties. However, it is especially preferred to use as secondary amine reactants, compounds of the formula:

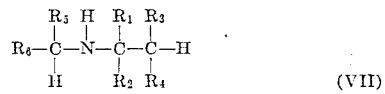

(VII)

or the formula:

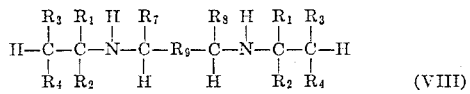

(VIII)

wherein $R_1$, $R_2$, $R_3$, and $R_4$ are as defined above, wherein $R_5$, $R_6$, $R_7$, and $R_8$ are selected from the group consisting of hydrogen, alkyl, alkenyl, alkynyl, cycloalkyl, cycloalkenyl, aryl, aralkyl, aralkenyl, heterocyclyl, and heterocycloalkyl, wherein $R_9$ is divalent and selected from the group consisting of alkylene, oxyalkylene, oxydialkylene, poly(oxyalkylene), alkenylene, alkynylene, cycloalkylene, cycloalkenylene, arylene, oxyarylene, oxydiarylene, heterocyclylene, and combinations thereof, each member of said groups having zero to 3 substituents, inclusive, each substituent preferably but not necessarily being unreactive with phosgene, said heterocyclyl, heterocycloalkyl, and heterocyclylene each having as sole heteroatom moieties one to 2, inclusive, selected from the group consisting of —O—, —S—, and —N=, and wherein the term "unreactive with phosgene" is as defined above. Particularly preferred are Formula VII reactants wherein $R_5$ is hydrogen and Formula VIII reactants wherein $R_7$ and $R_8$ are hydrogen.

Phosgenation of a Formula VII reactant produces a secondary carbamoyl chloride of the formula:

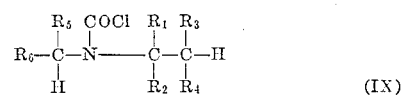

(IX)

Phosgenation of a Formula VIII reactant produces a bis[carbamoyl chloride] of the formula:

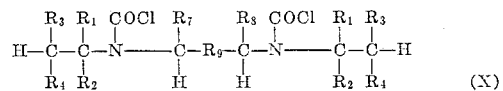

(X)

Heating a Formula IX secondary carbamoyl chloride in the range 50° to 250° C. produces a monoisocyanate of the formula:

(XI)

Heating a Formula X bis[carbamoyl chloride] in the same range produces a diisocyanate of the formula:

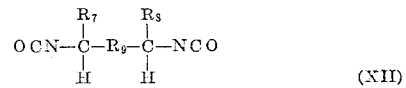

(XII)

Examples of alkyl are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, and isomeric forms thereof. Examples of alkenyl are vinyl, allyl, 1-methylallyl, 2-methylallyl (methallyl), 2-butenyl (crotyl), 3-butenyl, 1,2-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 5-hexenyl, 3-heptenyl, 4-octenyl, 10-dodecenyl, 9-octadecenyl, and the like. Examples of alkynyl are 2-propynyl (propargyl), 1-methyl-2-propynyl, 2-butynyl, 3-butynyl, 1-methyl-2-butynyl, 1-methyl-3-butynyl, 3-pentynyl, 1,2-dimethyl-3-butynyl, 4-pentynyl, 2-methyl-3-pentynyl, 3-hexynyl, 7-octynyl, 5-dodecynyl, 9-octadecynyl, and the like. Examples of cycloalkyl are cyclopropyl, cyclobutyl, cyclopentyl, cyclohexyl, cycloheptyl, cyclooctyl, cyclononyl, cyclodecyl, and the like, as well as bicyclic and tricyclic moieties which may be considered as having been derived by removal of a hydrogen atom from such bicyclic and tricyclic hydrocarbons as bicyclo[2.2.1]heptane, bicyclo[3.2.1]octane, decalin, bicyclo[2.2.2]octane, and perhydrophenanthrene. Examples of cycloalkenyl are 1-cyclopentenyl, 2-cyclopentenyl, 3-cyclopentenyl, 1-cyclohexenyl, 2-cyclohexenyl, 3-cyclohexenyl, 1-cycloheptenyl, 2-cycloheptenyl, 4-cycloheptenyl, 1-cyclooctenyl, 5-cyclodecenyl, and the like. Examples of aryl are phenyl, 1-naphthyl, 2-naphthyl, and the isomeric forms of diphenyl, terphenyl, phenanthryl, anthryl, acenaphthenyl, fluorenyl, fluoroanthenyl, pyrenyl, chrysenyl, naphthacenyl, and the like. Examples of aralkyl are benzyl, phenethyl, 1-phenylethyl, 2-phenylpropyl, 3-phenylpropyl, 4-phenylbutyl, 10-phenyldecyl, 1-naphthylmethyl, 2-(2-naphthyl)propyl, 4-(9-anthryl)butyl, and the like. Examples of aralkenyl are styryl, 3-phenylallyl, 4-(1-naphthyl)-2-butenyl, 2-methyl-3-(4-phenanthryl)-5-hexenyl, and the like.

The term "heterocyclyl" is intended to designate a moiety which contains at least one heterocyclic ring with at least one heteroatom, and which can be fused through vicinal pairs of carbon atoms to one or more aromatic or alicyclic ring systems, the free valence of said heterocyclyl being at a heterocyclic, aromatic, or alicyclic ring carbon atoms. The term "heterocycloalkyl" is intended to designate a heterocyclyl as above defined attached at its free valence to one of the two free valences of an alkylene.

Examples of heterocyclyl having as sole heteroatom moieties one to two selected from the group consisting of —O—, —S—, and —N=, are the moieties which can be considered as having been derived by removal of any single hydrogen atom from furan, tetrahydrofuran, thiophene, tetrahydrothiophene, pyridine, benzofuran, benzothiophene, dibenzofuran, dibenzothiophene, quinoline, isoquinoline, acridine, thiazole, oxazole, isoxazole, pyridazine, dioxane, pyrazine, pyrimidine, phenanthridine, phenazine, phenothioxin, and the like.

Examples of divalent moieties within the scope of $R_9$ as defined above have the following structures: —CH$_2$—, —CH$_2$CH$_2$—, —CH$_2$CH$_2$CH$_2$—, —CH$_2$CH(CH$_3$)—, —CH$_2$CH(CH$_3$)CH$_2$—
—CH$_2$(CH$_2$)$_5$CH$_2$—
—CH$_2$(CH$_2$)$_{10}$CH$_2$—
—CH=CH—
—CH$_2$CH=CH—
—CH$_2$CH=CHCH$_2$—
—CH(CH$_3$)CH=CH—
—CH$_2$(CH$_2$)$_5$CH=CH—
—CH$_2$(CH$_2$)$_7$CH=CH(CH$_2$)$_7$CH$_2$—
—C≡C—
—CH$_2$C≡C—
—CH$_2$C≡CCH$_2$—
—CH$_2$(CH$_2$)$_5$C≡C—
—CH=CHCH=CH—
—CH$_2$CH=CHCH$_2$CH=CHCH$_2$—
—CH$_2$C≡CCH=CHCH$_2$—
—OCH$_2$—
—OCH$_2$CH$_2$—
—OCH(CH$_3$)—
—OCH$_2$CH(CH$_3$)—
—OCH(CH$_3$)CH$_2$—
—OCH$_2$CH$_2$OCH$_2$—
—CH$_2$OCH$_2$—
—CH$_2$(OCH$_2$CH$_2$)$_2$OCH$_2$—
—OCH$_2$CH$_2$(OCH$_2$)$_4$OCH$_2$CH$_2$—
—CH(CH$_3$)OCH(CH$_3$)CH$_2$OCH$_2$—
—CH$_2$(OCH$_2$CH$_2$)$_{10}$OCH$_2$—

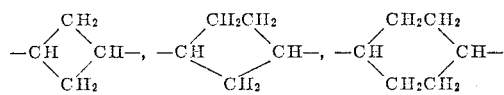

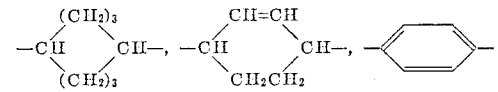

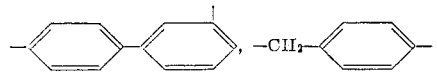

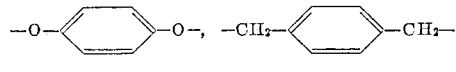

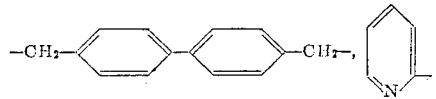

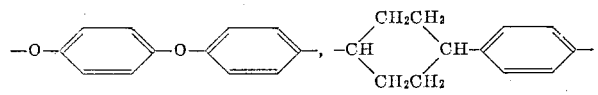

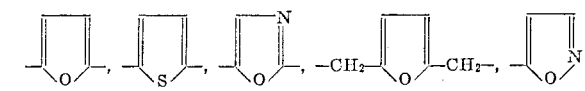

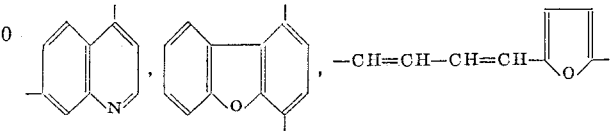

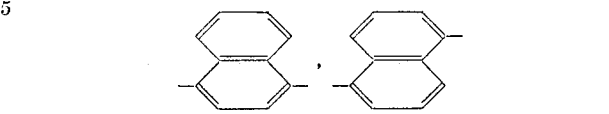

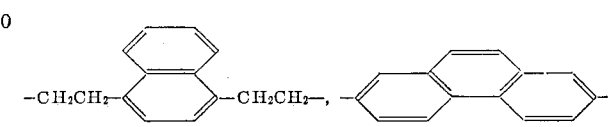

and the like, as well as those divalent moieties which may be considered as having been derived by removal of any second hydrogen atom from any of the alkyl, alkenyl, alkynyl, cycloalkyl, cycloalkenyl, aryl, aralkyl, aralkenyl, heterocyclyl, and heterocycloalkyl moieties mentioned above.

By the terms "oxyalkylene" and "oxyarylene" are meant divalent moieties containing an oxygen atom with one valence bond attached to an alkylene or arylene moiety, i.e., —O—alkylene— or —O—arylene—. By the terms "oxydialkylene" and "oxydiarylene" are meant divalent moieties containing an oxygen atom with both valence bonds attached to separate alkylene or arylene moieties, i.e., —alkylene—O—alkylene— or —arylene—O—arylene—

By the term "poly(oxyalkylene)" is meant is a divalent moiety containing a plurality of oxygen atoms and a plurality of alkylene moieties linked together to form a chain which can have at either or both ends either an oxygen or an alkylene moiety, e.g., —O—alkylene—O—alkylene;
—O—alkylene—O—alkylene—O—;
alkylene—O—alkylene—O—alkylene—.

Examples of substituents which are unreactive with phosgene as above defined are: alkyl, e.g., methyl, butyl, and decyl; alkoxy, e.g., methoxy, ethoxy, and pentyloxy; alkylthio, e.g., methylthio, propylthio, and heptylthio; halo, e.g., fluoro, chloro, bromo, and iodo; alkoxycarbonyl, e.g., methoxycarbonyl, propoxycarbonyl, and nonyloxycarbonyl; nitro; cyano; and the like. An important criterion with regard to unreactive substituents is that they not contain hydrogen atoms attached to atoms other than carbon, e.g., oxygen, sulfur, and nitrogen.

As discussed above, it is preferred to prepare the novel secondary carbamoyl chlorides of this invention by reacting the corresponding secondary amines with phosgene. Suitable secondary amines for this purpose are those with one or more moieties of the formula:

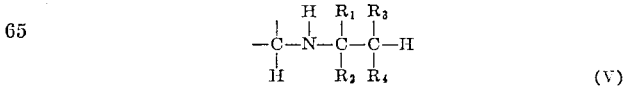

(V)

or preferably of the formula:

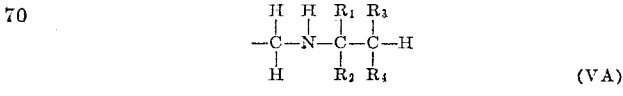

(VA)

wherein $R_1$, $R_2$, $R_3$, and $R_4$ are as defined above. Such secondary amines are either known in the art or can be prepared by methods known in the art, for example, by reaction of a primary amine of the formula:

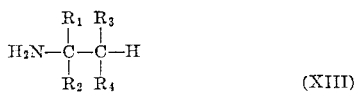

(XIII)

wherein $R_1$, $R_2$, $R_3$, and $R_4$ are as defined above, with the appropriate organic halide, preferably the chloride or bromide [e.g., Bortnick et al., J. Am. Chem. Soc. 78, 4039–42 (1956)]; by the method known generally as the Leuckart reaction, involving, for example, interaction of an aldehyde or a ketone and a mixture of formic acid and a tertiary alkylamine, for example, tert-butylamine or tert-octylamine [e.g., Moore, "Organic Reactions," John Wiley and Sons, Inc., New York, N.Y., vol. V, Ch. 7, 301–30 (1949)]; or by the method known generally as reductive alkylation, involving, for example, interaction of an aldehyde or a ketone with a tertiary alkylamine, for example, tert-butylamine, or tert-octylamine, in the presence of a reducin agent, for example, hydrogen plus a hydrogenation catalyst or "nascent" hydrogen, usually from a metal-acid combination [e.g., Emerson, "Organic Reactions," John Wiley and Sons, Inc., New York, N.Y., vol. IV, Ch. 3, 174–255 (1948)]. A modification of the latter method comprises reacting the carbonyl compound, preferably an aldehyde, with a tertiary alkylamine under non-reducing conditions, isolating the resulting Schiff's base (aldimine), and transforming the latter by hydrogenation to the desired secondary amine [e.g., Hurwitz, U.S. Patent 2,582,128]. Secondary amines useful for the purposes of this invention can also be prepared by reacting the above Schiff's bases with acetylene or with a phenol. These latter two methods, as well as other methods for preparing secondary amines, are reviewed in "t-Alkyl Primary Amines," Special Products Bulletin 119P, Rohm and Haas Co., Philadelphia, Pa., pp. 29–42 (1958).

When preparing the novel secondary carbamoyl chlorides according to this invention, one molecule of phosgene is required for the transformation of each secondary amine grouping to a secondary carbamoyl chloride grouping. For those secondary amines in which the formula V secondary amine moieties are the sole moieties reactive with phosgene, as defined above, it is preferred to interact substantially equivalent amounts of phosgene and secondary amine. In other words, if the secondary amine contains one Formula V moiety, one mole of phosgene would preferably be reacted with one mole of the secondary amine. If the secondary amine contains, for example, 2, 3, or 4 Formula V moieties, 2, 3, or 4 moles of phosgene, respectively, would preferably be reacted with one mole of the secondary amine. There is usually no advantage in using smaller amounts of phosgene since this would result in a lower yield of the desired secondary carbamoyl chloride and would leave part of the Formula V secondary amine moieties unreacted. It is often advantageous to use a slight phosgene excess, for example, about 5 to about 10% excess, to ensure that each equivalent of secondary amine is contacted with a full equivalent of phosgene. As discussed in greater detail below, in some instances, it is also advantageous to purge by-product hydrogen chloride from the reaction mixture with a slow stream of additional phosgene. If the secondary amine contains phosgene-reactive moieties other than those of Formula V, then, of course, phosgene sufficient to react with these other moieties must also be used. As will be apparent to those skilled in the art, the necessary amounts of additional phosgene will depend upon the nature and number of these other phosgene-reactive moieties.

The reaction between secondary amine and phosgene is carried out most advantageously by mixing these reactants in the presence of an inert solvent, for example, benzene, toluene, the xylenes, cumene, mesitylene, tetrahydronaphthalene, heptane, octane, mineral oil, chlorobenzene, o-dichlorobenzene, 1,2-dichloroethane (ethylene dichloride), 1,1,2-trichloroethane, and the like. A solvent is not necessary if the secondary amine is a liquid at the phosgenation temperature.

The reaction between secondary amine and phosgene usually takes place at low to moderate temperatures, i.e., from about −10° to 50° C. However, one molecule of hydrogen chloride is produced by the interaction of a molecule of phosgene and a secondary amine moiety, and this hydrogen chloride usually reacts more rapidly than phosgene with unreacted secondary amine, forming a hydrochloride salt. These salts are substantially less reactive with phosgene than the free secondary amine bases, and a substantially higher reaction temperature is required for their phosgenation. In some instances, it is satisfactory to allow half of the secondary amine to react with phosgene in the range −10° to 50° C., and then to raise the temperature to about 100° to 200° C. to cause the second half of the amine, now present as hydrochloride, to react with the remaining phosgene. During this second stage, it is advantageous to pass a slow stream of additional phosgene through the reaction mixture both to ensure the presence of sufficient phosgene and to sweep out hydrogen chloride. However, concurrent formation of isocyanate by decomposition of secondary carbamoyl chloride as the latter appears in the reaction mixture sometimes occurs at these higher temperatures. Unless this is desired, it is preferred to use a lower phosgenation temperature, e.g., below about 100° C., and to remove hydrogen chloride as it is formed by having present in the reaction mixture a tertiary amine in molecular amount at least equal to the amount of hydrogen chloride which is expected to be formed. Even though some secondary amine hydrochloride will be formed during this phosgenation, this hydrochloride will gradually change to free base and hydrogen chloride, the former then being phosgenated and the latter being absorbed by the tertiary amine.

Any tertiary amine can be used for the above purpose, provided that the amine is soluble in the reaction solvent, if one is used, and is sufficiently basic to compete with secondary amine for the hydrogen chloride. Examples of suitable tertiary amines are trialkylamines, e.g., trimethylamine, triethylamine, tripropylamine, tributylamine, triisobutylamine, N-methyldibutylamine; heterocyclic amines, e.g., pyridine, quinoline, isoquinoline, N-methylpiperidine; and aromatic amines, e.g., dimethylaniline, diethylaniline, dibutylaniline; and the like. Particularly preferred are triethylamine and tributylamine.

The phosgene, secondary amine, and tertiary amine, can be mixed in any order. If tertiary amine and phosgene are mixed first, they usually interact to form a complex. This complex can react directly with secondary amine to form secondary carbamoyl chloride and tertiary amine hydrochloride, or it can first regenerate phosgene and tertiary amine which then react separately. In some instances, particularly at higher temperatures, an undesirable decomposition of this complex occurs, forming a different carbamoyl chloride and an alkyl chloride. Another more preferred mode of reagent combination is gradual addition of a mixture of secondary amine and tertiary amine to a phosgene solution.

After either of the above modes of addition, the resulting tertiary amine hydrochloride will precipitate from the reaction mixture or remain in solution, depending upon the solubility characteristics of the hydrochloride and the nature of the reaction solvent. For example, triethylamine hydrochloride tends to precipitate from benzene; tributylamine hydrochloride tends to remain in benzene solution. When secondary carbamoyl chloride is to be isolated before transformation to isocyanate, it is preferred to choose tertiary amine and reaction solvent such that the tertiary amine hydrochloride will precipitate from the reaction mixture. The hydrochloride can then be separated by filtration, and the desired secondary carbamoyl chloride isolated more easily and in a relatively pure state. On the other hand, when secondary carbamoyl chloride is to be transformed directly to isocyanate without isolation, it is often advantageous to choose tertiary amine and solvent such that the hydrochloride will remain in solution. An unnecessary and time-consuming filtration is thereby avoided. As will be apparent to those skilled in the art, some secondary carbamoyl chlorides will have solubility characteristics such that they will precipitate along with tertiary amine hydrochloride. In that event, secondary carbamoyl chloride is separated from the total precipitate by extraction with a suitable solvent, preferably at an elevated temperature.

When it is desired to isolate secondary carbamoyl chloride, this may be done by conventional techniques, for example, by removal of reaction solvent by distillation, preferably at reduced pressure. Purification of secondary carbamoyl chloride, if desired, can be accomplished by reduced pressure distillation, by crystallization from a suitable solvent or mixture of solvents, or by chromatography.

A monoisocyanate, diisocyanate, or higher polyisocyanate is prepared according to this invention by heating one of the above described secondary carbamoyl chloride reactants in the range about 50° to about 250° C. An alkyl chloride and/or an alkene plus hydrogen chloride are also formed. When, as is preferred, the secondary carbamoyl chloride reactant has been prepared by phosgenation of a secondary amine, said reactant can be isolated before being transformed to an isocyanate, or the entire phosgenation reaction mixture can be heated to obtain isocyanate.

It is advantageous but not essential to carry out the transformation of secondary carbamoyl chloride reactant to isocyanate in the presence of a solvent. If a total phosgenation reaction mixture is heated to obtain isocyanate, any solvent originally present therein can serve as the solvent for the heating step, or more of the same or a different solvent can be added. Any inert solvent of boiling point appropriate to the desired reaction temperature can be used. An "inert" solvent is one which can be recovered substantially unchanged when the desired reaction is complete even though the solvent might have had an active role in influencing the course of the reaction. In general, solvents which react with isocyanates should be avoided. In particular, the solvent should not contain hydrogen atoms attached to elements other than carbon, e.g., oxygen, sulfur, and nitrogen. Examples of suitable solvents are those listed above as useful in the phosgenation reaction. It was observed that cleavage of a secondary carbamoyl chloride reactant often occurs at a lower temperature or more rapidly with relatively polar solvents such as nitrobenzene than with relatively non-polar solvents such as toluene. Solvents of moderate polarity such as o-dichlorobenzene, 1,2-dichloroethane, and 1,1,2-trichlorethane are usually intermediate in this regard. The polarity of these solvents is related to their dielectric constants as discussed by McElvain, "The Characterization of Organic Compounds," The Macmillan Company, New York, N.Y., 44–53 (1947).

The tertiary alkyl part of the formula V carbamoyl chloride moiety can also influence the yield and purity of the desired isocyanate. For example, during the desired cleavage of the tertiary alkyl, alkene plus hydrogen chloride rather than alkyl chloride are often formed, particularly in the higher part of the preferred reaction temperature range. This hydrogen chloride can then react with the desired isocyanate to form an unwanted primary carbamoyl chloride. Unless the formation of the latter is avoided or unless it is transformed back to isocyanate, it will remain to contaminate and reduce the yield of the isocyanate. This situation is further complicated by the variable tendencies of alkenes to react with hydrogen chloride to form alkyl chlorides, and of alkyl chlorides to decompose to form alkenes and hydrogen chloride. Any combination of these several reactions can occur during the production of a particular isocyanate.

When the desired isocyanate has a relatively high boiling point, for example, above about 75° C., it is preferred that the tertiary alkyl part of the Formula V secondary carbamoyl chloride moiety be tert-butyl because the isobutylene and tertiary-butyl chloride products have relatively low boiling points, and can be removed from the reaction mixture easily by fractional distillation. The temperature of the reaction residue can then be raised or the pressure reduced, and the desired isocyanate isolated by distillation. If reaction solvent distills with the isocyanate, a subsequent fractional distillation will be necessary. Alternatively, the isocyanate can be isolated by another conventional technique, for example, crystallization from a suitable solvent or mixture of solvents, or chromatography.

On the other hand, when relatively low boiling isocyanates are to be formed, it is preferred to have a larger tertiary alkyl group present in the secondary carbamoyl chloride moiety, for example, tert-octyl, so that the alkene and/or alkyl chloride will remain behind in the reaction mixture while isocyanate is removed by distillation. If isocyanate, alkene, and alkyl chloride codistill from a reaction mixture, a later fractional distillation will be necessary.

When a tendency toward formation of the aforementioned primary carbamoyl chloride is observed, it is often advantageous to pass a slow stream of an inert gas, for example, nitrogen, helium, or argon, into the flask while heating a secondary carbamoyl chloride reactant. This inert gas will sweep out hydrogen chloride as it is formed, thus preventing its reaction with isocyanate. Also, if any primary carbamoyl chloride does form, it will often be transformed back to isocyanate and hydrogen chloride by this inert gas purge.

It is often advantageous to have a tertiary amine present during transformation of secondary carbamoyl chloride reactant to isocyanate. One intended function of the tertiary amine is to absorb hydrogen chloride and prevent formation of unwanted primary carbamoyl chloride. Therefore, it is usually preferred to add at least one equivalent of tertiary amine for each equivalent of secondary carbamoyl chloride reactant to be transformed to isocyanate. In those instances in which a tertiary amine is to be used to facilitate phosgenation of a secondary amine, the total reaction mixture then being heated to obtain isocyanate, at least two equivalents of the tertiary amine can with advantage be added before phosgenation so that one equivalent will remain available after the phosgenation to aid in the formation of isocyanate. In other instances, the necessary second equivalent of tertiary amine is added at a later stage.

The formation of isocyanates from secondary carbamoyl chloride reactants can also be influenced by a catalyst. Frequently useful in this regard are the Lewis acids as defined by Hine, "Physical Organic Chemistry," McGraw-Hill Book Company, Inc., New York, N. Y., 46–7 (1956). These substances appear to accelerate the desired cleavage of the secondary carbamoyl chloride moieties and make feasible a shorter reaction time and a lower reaction temperature. Preferred Lewis acids for this purpose are the metal halides, e.g., ferric chloride, ferric bromide, zinc chloride, cobalt chloride, mercuric chloride, aluminum chloride, stannic chloride, antimony pentachloride, and the like. Particularly preferred is ferric chloride.

Tertiary amines, in addition to their role as hydrogen chloride absorbents, also appear to have a beneficial catalytic effect on the transformation of secondary carbamoyl chloride reactant to isocyanate. For reasons not completely understood but perhaps because of this catalytic activity, the yield and purity of the desired isocyanate are often dependent on the reaction stage at which tertiary amine is added. For example, in some instances, the best results are obtained by heating a phosgenation reaction mixture or isolated secondary carbamoyl chloride reactant in the presence of an inert solvent and in the absence of additional tertiary amine so that isocyanate and hydrogen chloride are deliberately allowed to react to form primary carbamoyl chloride. Then, the additional equivalent of tertiary amine is added and the total mixture heated to change primary carbamoyl chloride to isocyanate. In other instances, the best results are obtained by heating a phosgenation reaction mixture or a secondary carbamoyl chloride reactant in an inert solvent to the temperature at which cleavage of the tertiary alkyl starts to occur, and then adding the additional equivalent of tertiary amine. In still other instances, optimum results are obtained by having the additional equivalent of tertiary amine in contact with the secondary carbamoyl chloride reactant before an attempt is made to transform the latter to isocyanate.

As will be apparent to those skilled in the art, optimum reaction conditions for each transformation of a secondary carbamoyl chloride reactant to an isocyanate can only be established empirically. Conditions which are optimum for the production of one isocyanate are not necessarily optimum for the production of another.

The isocyanates formed by any of the above embodiments of this invention can be purified by conventional techniques, for example, by distillation, recrystallization from a suitable solvent or mixture of solvents, partition between a pair of immiscible solvents, or chromatography, or by a combination of these methods.

The novel processes of this invention can be more fully understood by the following examples.

EXAMPLE 1

*Part A.—N-tert-butylbenzylamine*

A mixture of benzyl chloride (75.9 g.; 0.6 mole), tert-butylamine (87.6 g.; 1.2 mole), and dimethylformamide (150 ml.) was refluxed for 3 hours. The temperature of the mixture rose gradually from 80° to 140° C. The mixture was allowed to stand at about 25° C. for about 15 hours, and was then reheated to about 161° C. during 3½ hours. About 78% of the theoretical amount of excess tert-butylamine distilled out at 45–55° C. during this latter heating time. The residual reaction mixture was cooled to 10–15° C., and the solid which precipitated was filtered and dried to give 93.8 g. of N-tert-butylbenzylamine hydrochloride, M.P. 249–253° C. Evaporation of the filtrate to about 70 ml., cooling, and filtration gave an additional 18.0 g. of the same material. The total yield of N-tert-butylbenzylamine hydrochloride was 93%.

A 100-g. portion of this hydrochloride was mixed with 150 ml. of water and 60 g. of a 50% aqueous sodium hydroxide solution. The organic liquid which separated was collected and dried with sodium hydroxide to give 76.1 g. of N-tert-butylbenzylamine; B.P. on distillation, 100° C. at 17 mm.; $n_D^{22.7}$ 1.4951.

*Part B.—Benzyl-tert-butylcarbamoyl chloride*

A solution of phosgene (30 g.; 0.3 mole) in 500 ml. of toluene at about 0° to about 10° C. was added dropwise with stirring during 25 minutes to a solution of N-tert-butylbenzylamine (48.6 g.; 0.3 mole) in 100 ml. of toluene at about 5° C. The resulting thick suspension of solid was then heated to the reflux temperature, and was heated and stirred for about 15 hours. A slow stream of phosgene (about 10–20 g. per hour) was passed through the reaction mixture throughout the addition and reflux operations. The clear solution which resulted was swept free of phosgene with a stream of nitrogen, and was then evaporated at reduced pressure and 35° C. to a volume of about 100 ml. Cooling and filtration gave 66 g. of bnezyl-tert-butylcarbamoyl chloride in the form of yellow to pale brown crystals. The yield was 96%. Recrystallization of a small sample from toluene gave benzyl-tert-butylcarbamoyl chloride in the form of white crystals; M.P. 85–89° C.

*Part C.—Benzyl isocyanate*

Benzyl-tert-butylcarbamoyl chloride (66 g.; 0.3 mole) was melted and then heated in a distillation flask at 150–160° C. for one hour while a slow stream of nitrogen was passed into the molten material. The material gradually darkened from yellow to brown to greenish black. The nitrogen and gaseous products were passed through a trap cooled with solid carbon dioxide. After the reaction was completed, the trap contents (21 g.) were determined to be a mixture of tert-butyl chloride, isobutylene, hydrogen chloride and traces of benzyl isocyanate. A substantial amount of hydrogen chloride passed through the cold trap.

The residual material in the reaction flask was then distilled at reduced pressure to give 33.5 g. of benzyl isocyanate; B.P. 104° to 110° C. at 31 to 36 mm.; $n_D^{22.5}$ 1.5242. The yield was 84% based on the original amount of N-tert-butylbenzylamine. The tarry residue in the distillation flask weighed 5.8 g.

When the nitrogen stream was omitted in an otherwise identical run, the final reaction product contained substantial amounts of benzylcarbamoyl chloride, and the cold trap contained largely isobutylene.

EXAMPLE 2

*Part A.—N-tert-butylcinnamylamine*

Following the procedure of Example 1, part A, cinnamyl chloride was reacted with tert-butylamine to give N-tert-butylcinnamylamine.

*Part B.—tert-butylcinnamylcarbamoyl chloride*

Following the procedure of Example 1, part B, N-tert-butylcinnamylamine was reacted with phosgene to give tert-butylcinnamylcarbamoyl chloride.

*Part C.—Cinnamyl isocyanate*

Following the procedure of Example 1, part C, tert-butyl-cinnamylcarbamoyl chloride was heated to give cinnamyl isocyanate.

EXAMPLE 3

*Part A.—1-[2-(tert-butylamino)ethyl]naphthalene*

Following the procedure of Example 1, part A, 1-(2-chloroethyl)naphthalene was reacted with tert-butylamine to give 1-[2-(tert-butylamino)ethyl]naphthalene.

*Part B.—Tert-butyl[2-(1-naphthyl)ethyl]carbamoyl chloride*

Following the procedure of Example 1, part B, 1-[2-(tert-butylamino)ethyl]naphthalene was reacted with phosgene to give tert-butyl[2-(1-naphthyl)ethyl]carbamoyl chloride.

*Part C.—2-(1-naphthyl)ethyl isocyanate*

Following the procedure of Example 1, part C, tert-butyl[2-(1-naphthyl)ethyl]carbamoyl chloride was heated to give 2-(1-naphthyl)ethyl isocyanate.

EXAMPLE 4

*Part A.—N-tert-butylfurfurylamine*

Following the procedure of Example 1, part A, furfuryl chloride was reacted with tert-butylamine to give N-tert-butylfurfurylamine.

*Part B.—Tert-butylfurfurylcarbamoyl chloride*

Following the procedure of Example 1, part B, N-tert-butylfurfurylamine was reacted with phosgene to give tert-butylfurfurylcarbamoyl chloride.

*Part C.—Furfuryl isocyanate*

Following the procedure of Example 1, part C, tert-butylfurfurylcarbamoyl chloride was heated to give furfuryl isocyanate.

EXAMPLE 5

*Part A.—N-tert-butyl-2-thenylamine*

Following the procedure of Example 1, part A, 2-thenyl chloride was reacted with tert-butylamine to give N-tert-butyl-2-thenylamine.

*Part B.—Tert-butyl-2-thenylcarbamoyl chloride*

Following the procedure of Example 1, part B, N-tert-butyl-2-thenylamine was reacted with phosgene to give tert-butyl-2-thenylcarbamoyl chloride.

*Part C.—2-thenyl isocyanate*

Following the procedure of Example 1, part C, tert-butyl-2-thenylcarbamoyl chloride was heated to give 2-thenyl isocyanate.

EXAMPLE 6

*Part A.—4-[(tert-butylamino)methyl]pyridine*

Following the procedure of Example 1, part A, 4-(chloromethyl)pyridine was reacted with tert-butylamine to give 4-[(tert-butylamino)methyl]pyridine.

*Part B.—Tert-butyl(4-pyridylmethyl)carbamoyl chloride*

Following the procedure of Example 1, part B, 4-[(tert-butylamino)methyl]pyridine was reacted with phosgene to give tert-butyl(4-pyridylmethyl)carbamoyl chloride.

*Part C.—4-pyridylmethyl isocyanate*

Following the procedure of Example 1, part C, tert-butyl(4-pyridylmethyl)carbamoyl chloride was heated to give 4-pyridylmethyl isocyanate.

EXAMPLE 7

*Part A.—2-[2-(tert-butylamino)ethyl]quinoline*

Following the procedure of Example 1, part A, 2-(2-chloroethyl)quinoline was reacted with tert-butylamine to give 2-[2-(tert-butylamino)ethyl]quinoline.

*Part B.—Tert-butyl[2-(2-quinolyl)ethyl]carbamoyl chloride*

Following the procedure of Example 1, part B, 2-[2-(tert-butylamino)ethyl]quinoline was reacted with phosgene to give tert-butyl[2-(2-quinolyl)ethyl]carbamoyl chloride.

*Part C.—2-(2-quinolyl)ethylisocyanate*

Following the procedure of Example 1, part C, tert-butyl[2-(2-quinolyl)ethyl]carbamoyl chloride was heated to give 2-(2-quinolyl)ethyl isocyanate.

EXAMPLE 8

*Part A.—N-tert-butylallylamine*

Allyl chloride (76.5 g.; 1.0 mole) was added dropwise with stirring to a solution of tert-butylamine (126 g.; 1.7 mole) in 250 ml. of dimethylformamide. About ⅔ of the allyl chloride was added during 30 minutes while heating the mixture at 60 to 70° C. The remainder of the allyl chloride was then added during 15 minutes without further external heating, the temperature of the mixture rising because of the exothermic reaction to about 73° C. The mixture was then refluxed for 3 hours, the reaction temperature rising gradually to 120° C. The mixture was allowed to stand at about 25° C. for about 15 hours. About ⅔ of the excess tert-butylamine was then removed by distillation. The residual reaction mixture was cooled to about 10° C., and the solid which precipitated was filtered and dried to give 101 g. of N-tert-butylallylamine hydrochloride; M.P. 157–162° C. Evaporation of the filtrate to about 150 ml., cooling, and filtration gave an additional 17.4 g. of the same material. The total yield of N-tert-butylallylamine hydrochloride was 79%.

A 67.8-g. portion of this hydrochloride was treated with sodium hydroxide as in Example 1, part A, to give an oil which was distilled to give 35.6 g. of N-tert-butylallylamine; B.P. 111–112° C. at 760 mm.; $n_D^{22.5}$ 1.4160.

*Part B.—Allyl isocyanate*

Phosgene (15.0 g.; 0.15 mole) was passed into a solution of tributylamine (27.8 g.; 0.15 mole) in 100 ml. of o-dichlorobenzene at 5° C. Thereafter, N-tert-butylallylamine (17.0 g.; 0.15 mole) was added dropwise during 10 minutes at 0° to 5° C. The resulting reaction mixture was allowed to warm with stirring to about 25° C. during one hour. The small amount of residual phosgene was removed by purging with nitrogen at 50° C. during 30 minutes.

The flask containing the reaction mixture was then equipped with a distillation column leading successively to a condenser, a receiver, and a trap cooled with solid carbon dioxide. The entire reaction mixture was heated to about 125° C., and additional tributylamine (27.8 g.; 0.15 mole) was added dropwise during 10 minutes at 125° C. The temperature of the mixture was raised gradually to 175° C. during 1 hour, and then gradually to 200° C. during a second hour. Allyl isocyanate (9.3 g.; 75% yield) containing a trace of allylcarbamoyl chloride gradually distilled at 80° to 85° C. The trap contained 7.6 g. of material. Analysis of the residue in the flask indicated the presence there of an additional 1.9 g. of allyl isocyanate.

In another otherwise identical run, triethylamine (30 g.; 0.3 mole) in place of tributylamine was present initially in solution with phosgene, no further triethylamine being added later. The 12 g. of distilled product contained about 50% allylcarbamoyl chloride and about 50% allyl isocyanate.

In still another otherwise identical run, a second equivalent (27.8 g.; 0.15 mole) of tributylamine was added to the cold o-dichlorobenzene solution of tributylamine, tert-butylallylamine, and phosgene, no further tributylamine being added later. The 14 g. of distillate was largely allylcarbamoyl chloride. Redistillation of this allylcarbamoyl chloride from a mixture with about 50 g. of tributylamine gave 8.7 g. (69.4% yield) of allyl isocyanate.

EXAMPLE 9

*Part A.—N,N'-di-tert-butyl-p-xylene-α,α'-diamine*

Following the procedure of Example 8, part A, propargyl chloride was reacted with tert-octylamine to give N-tert-butylpropargylamine.

*Part B.—Propargyl isocyanate*

Following the procedure of Example 8, part B, N-tert-octylpropargylamine was reacted with phosgene and then heated to give propargyl isocyanate.

EXAMPLE 10

*Part A.—N,N'-di-tert-butyl-p-xylene-α,α'-diamine*

Following the procedure of Example 1, part A, but using as reactants α,α'-dichloro-p-xylene (17.5 g.; 0.1 mole) and tert-butylamine (29.2 g.; 0.4 mole), there was obtained an 80% yield of N,N'-di-tert-butyl-p-xylene-α,α'-diamine; M.P. 68–70° C.

*Part B.—(p-Phenylenedimethylene)bis[tert-butylcarbamoyl chloride]*

A solution of N,N'-di-tert-butyl-p-xylene-α,α'-diamine (10 g.; 0.04 mole) in 50 ml. of chlorobenzene was added to a solution of phosgene (5 g.; 0.05 mole) in 100 ml. of chlorobenzene at about 10° C. during 15 minutes. The solution was then heated at the reflux temperature (about 130° C.) for about 72 hours while passing a slow stream of phosgene (about 10 to 20 g. per hour) through the reaction mixture. At the end of this time, the mixture was cooled to about 25° C. and filtered. The precipitate (2.9 g.) was identified as N,N'-di-tert-butyl-p-xylene-α,α'-diamine hydrochloride. The filtrate was evaporated at about 100° C. under reduced pressure. There was obtained 8.0 g. (69% yield based on unrecovered hydrochloride) of (p-phenylenedimethylene)bis[tert-butylcarbamoyl chloride] in the form of a light yellow solid which became colorless on standing in air.

*Part C.—p-Phenylenedimethylene diisocyanate*

(p - Phenylenedimethylene)bis[tert - butylcarbamoyl chloride] (8 g.; 0.02 mole) was heated in a distillation flask at about 200° C. while a slow stream of nitrogen was passed into the flask. The product was then distilled from the flask at reduced pressure. There was obtained 2.5 g. (62% yield) of p-phenylenedimethylene diisocyanate; B.P. 138° to 147° C. at 4 to 6 mm.; M.P. 37–39° C.

EXAMPLE 11

*Part A.—N,N'-(p-phenylenediethylidine)bis[tert-butylamine]*

Following the procedure of Example 10, part A, p-bis-(1-chloroethyl)benzene was reacted with tert-butylamine to give N,N' - (p - phenylenediethylidine)bis[tert-butylamine].

*Part B.—(p-Phenylenediethylidine)bis[tert-butylcarbamoyl chloride]*

Following the procedure of Example 10, part B, N,N'-(p-phenylenediethylidine)bis[tert-butylamine] was reacted with phosgene to give (p-phenylenediethylidine)bis[tert-butylcarbamoyl chloride].

*Part C.—p-Phenylenediethylidine diisocyanate*

Following the procedure of Example 10, part C (p-phenylenediethylidine)bis[tert-butylcarbamoyl chloride] was heated to give p-phenylenediethylidine diisocyanate.

EXAMPLE 12

*Part A.—N,N'-di-tert-butyl-1,4-cyclohexanebis(methylamine)*

Following the procedure of Example 10, part A, 1,4-bis(chloromethyl)cyclohexane was reacted with tert-butylamine to give N,N'-di-tert-butyl-1,4-cyclohexanebis(methylamine).

*Part B.—(1,4-cyclohexylenedimethylene)bis[tert-butylcarbamoyl chloride]*

Following the procedure of Example 10, part B, N,N'-di-tert,butyl-1,4-cyclohexanebis(methylamine) was reacted with phosgene to give (1,4-cyclohexylenedimethylene)bis[tert-butylcarbamoyl chloride].

*Part C.—1,4-cyclohexylenedimethylenediisocyanate*

Following the procedure of Example 10, part C, (1,4-cyclohexylenedimethylene)bis[tert-butylcarbamoyl chloride] was heated to give 1,4-cyclohexylenedimethylene diisocyanate.

EXAMPLE 13

*Part A.—N,N'-di-tert-butyl-1,6-diphenylhexamethylenediamine*

Following the procedure of Example 10, part A, 1,6-dichloro-1,6-diphenylhexane was reacted with tert-butylamine to give N,N'-di-tert-butyl-1,6-diphenylhexamethylenediamine.

*Part B.—(1,6-diphenylhexamethylene)bis[tert-butylcarbamoyl chloride]*

Following the procedure of Example 10, part B, N,N'-di-tert-butyl-1,6-diphenylhexamethylenediamine was reacted with phosgene to give (1,6-diphenylhexamethylene)bis[tert-butylcarbamoyl chloride].

*Part C.—1,6-diphenylhexamethylene diisocyanate*

Following the procedure of Example 10, part C, (1,6-diphenylhexamethylene)bis[tert-butylcarbamoyl chloride] was heated to give 1,6-diphenylhexamethylene diisocyanate.

EXAMPLE 14

*Part A.—N,N'-di-tert-butyl-1,6-dicyclohexylhexamethylenediamine*

Following the procedure of Example 10, part A, 1,6-dichloro-1,6-dicyclohexylhexane was reacted with tert-butylamine to give N,N'-di-tert-butyl-1,6-dicyclohexylhexamethylenediamine.

*Part B.—(1,6-dicyclohexylhexamethylene)bis[tert-butylcarbamoyl chloride]*

Following the procedure of Example 10, part B, N,N'-di-tert-butyl-1,6-dicyclohexylhexamethylenediamine was reacted with phosgene to give (1,6-dicyclohexylhexamethylene)bis[tert-butylcarbamoyl chloride].

*Part C.—1,6-dicyclohexylhexamethylene diisocyanate*

Following the procedure of Example 10, part C, (1,6-dicyclohexylhexamethylene)bis[tert-butylcarbamoyl chloride] was heated to give 1,6-dicyclohexylhexamethylene diisocyanate.

EXAMPLE 15

*Part A.—N,N'-[oxybis(p-phenylenemethylene)]bis[tert-butylamine]*

Following the procedure of Example 10, part A, bis(p-chloromethylphenyl) ether was reacted with tert-butylamine to give N,N'-[oxybis(p-phenylenemethylene)]bis[tert-butylamine].

*Part B.—[Oxybis(p-phenylenemethylene)bis[tert-butylcarbamoyl chloride]*

Following the procedure of Example 10, part B, N,N'-[oxybis(p-phenylenemethylene)]bis[tert-butylamine] was reacted with phosgene to give [oxybis(p-phenylenemethylene)]bis[tert-butylcarbamoyl chloride].

*Part C.—Oxybis(p-phenylenemethylene) diisocyanate*

Following the procedure of Example 10, part C, [oxybis(p-phenylenemethylene)]bis[tert-butylcarbamoyl chloride] was heated to give oxybis(p-phenylenemethylene) diisocyanate.

EXAMPLE 16

*Part A.—N,N'-di-tert-butyl-2-butene-1,4-diamine*

Following the procedure of Example 8, part A, but using as reactants 1,4-dichloro-2-butene (125 g.; 1.0 mole) and tert-butylamine (292 g.; 4.0 mole), there was obtained first a 71% yield of N,N'-di-tert-butyl-2-butene-1,4-diamine dihydrochloride, and then a 74% yield (based on the dihydrochloride) of the corresponding free base, N,N'-di-tert-butyl-2-butene-1,4-diamine; B.P. of free base, 95–100° C. at 6 mm.; $n_D^{22}$ 1.4494. The free base tends to form a crystalline hydrate melting in the range about 35° to 45° C., and transformable to the hygroscopic liquid form by addition of solid potassium hydroxide.

*Part B.—(2-butenylene)bis[tert-butylcarbamoyl chloride]*

A solution of N,N'-di-tert-butyl-2-butene-1,4-diamine (19.8 g.; 0.1 mole) and triethylamine (20.2 g.; 0.2 mole) in 150 ml. of benzene was added with stirring at 5° to 15° C. to a solution of phosgene (20 g.; 0.2 mole) in 100 ml. of benzene during 30 minutes. The reaction mixture was stirred for an additional 60 minutes at about 20° to about 30° C. The resulting solid mixture of triethylamine hydrochloride and (2-butenylene)-bis[tert-butylcarbamoyl chloride] was filtered and slurried twice with 100 ml. portions of hot benzene (65° C.), filtering after each slurry formation. The original filtrate and the slurry filtrates were combined, dried, and evaporated to give 29.4 g. of a solid which was recrystallized from benzene to give 27.2 g. (84% yield) of (2-butenylene)bis[tert-butylcarbamoyl chloride]; M.P. 132–134° C. The benzene mother liquors contained traces of diethylcarbamoyl chloride.

*Analysis.*—Calcd. for $C_{14}H_{24}N_2O_2Cl_2$: C, 52.01; H, 7.48; N, 8.66. Found: C, 52.14; H, 7.35; N, 8.72.

Part C.—2-butenylene diisocyanate

A mixture of 2-butenylenebis[tert-butylcarbamoyl chloride] (10.0 g.; 0.03 mole), 30 mg. of hydrated ferric chloride, and 90 g. of 1,2-dichloroethane was refluxed 18 hours (about 83° C.). An additional 15 mg. of ferric chloride was then added, and the mixture was refluxed 3 additional hours. The brown mixture was filtered. Evaporation at reduced pressure gave a brown oil which was distilled at reduced pressure to give 2.8 g. (65% yield) of 2-butenylene diisocyanate; B.P. 106° to 111° C. at 13 to 19 mm.

The 2-butenylene diisocyanate turned brown after two days at 25° C. in a closed container. Addition of excess methanol and a few mg. of 1,4-diazabicyclo[2.2.2]octane gave dimethyl (2-butenylene)bis[carbamate]; M.P. 143–144° C. The reported melting point for this substance is 137° C. [Siefken, Ann. 562, 122 (1949)].

EXAMPLE 17

Part A.—N,N'-di-tert-butyl-1,4-butanediamine

Following the procedure of Example 16, part A, 1,4-dibromobutane was reacted with tert-butylamine to give N,N'-di-tert-butyl-1,4-butanediamine.

Part B.—(Tetramethylene)bis[tert-butylcarbamoyl chloride]

Following the procedure of Example 16, part B, N,N'-di-tert-butyl-1,4-butanediamine was reacted with phosgene to give (tetramethylene)bis[tert-butylcarbamoyl chloride].

Part C.—Tetramethylene diisocyanate

Following the procedure of Example 16, part C, (tetramethylene)bis[tert-butylcarbamoyl chloride] was heated to give tetramethylene diisocyanate.

EXAMPLE 18

Part A.—N,N'-di-tert-butyl-2-butyne-1,4-diamine

Following the procedure of Example 16, part A, 1,4-dichloro-2-butyne was reacted with tert-butylamine to give N,N'-di-tert-butyl-2-butyne-1,4-diamine.

Part B.—(2-butynylene)bis[tert-butylcarbamoyl chloride]

Following the procedure of Example 16, part B, N,N'-di-tert-butyl-2-butyne-1,4-diamine was reacted with phosgene to give (2-butynylene)bis[tert-butylcarbamoyl chloride].

Part C.—2-butynylene diisocyanate

Following the procedure of Example 16, part C, (2-butynylene)bis[tert-butylcarbamoyl chloride] was heated to give 2-butynylene diisocyanate.

EXAMPLE 19

Part A.—N,N'-di-tert-butyl-2,5-furanbis(methylamine)

Following the procedure of Example 16, part A, 1,4-bis(chloromethyl)furan was reacted with tert-butylamine to give N,N'-di-tert-butyl-2,5-furanbis(methylamine).

Part B.—(2,5-furandiyldimethylene)-bis[tert-butylcarbamoyl chloride]

Following the procedure of Example 16, part B, N,N'-di-tert-butyl-2,5-furanbis(methylamine) was reacted with phosgene to give (2,5-furandiyldimethylene)bis[tert-butylcarbamoyl chloride].

Part C.—2,5-furandiyldimethylene diisocyanate

Following the procedure of Example 16, part C (2,5-furandiyldimethylene(bis[tert - butylcarbamoyl chloride] was heated to give 2,5-furandiyldimethylene diisocyanate.

EXAMPLE 20

Part A.—N,N'-di-tert-butyl-2,2-oxybis(ethylamine)

Following the procedure of Example 16, part A, 2,2'-dichlorodiethyl ether was reacted with tert-butylamine to give N,N'-di-tert-butyl-2,2'-oxybis(ethylamine).

Part B.—[Oxybis(ethylene)]bis[tert-butylcarbamoyl chloride]

Following the procedure of Example 16, part B, N,N'-di-tert-butyl-2,2'-oxybis(ethylamine) was reacted with phosgene to give [oxybis(ethylene)]bis[tert-butylcarbamoyl chloride].

Part C.—Oxybis(ethylene) diisocyanate

Following the procedure of Example 16, part C [oxybis(ethylene)]bis[tert-butylcarbamoyl chloride] was heated to give oxybis(ethylene) diisocyanate.

EXAMPLE 21

Part A.—N,N'-di-tert-butyl-3,6,9-trioxaundecane-1,11-diamine

Following the procedure of Example 16, part A, 1,11-dibromo-3,6,9-trioxaundecane was reacted with tert-butylamine to give N,N'-di-tert-butyl-3,6,9-trioxaundecane-1,11-diamine.

Part B.—(3,6,9-trioxaundecamethylene)-[tert-butylcarbamoyl chloride]

Following the procedure of Example 16, part B, N,N'-di-tert-butyl-3,6,9-trioxaundecane-1,11-diamine was reacted with phosgene to give (3,6,9-trioxaundecamethylene)bis[tert-butyl-carbamoyl chloride].

Part C.—3,6,9-trioxaundecamethylene diisocyanate

Following the procedure of Example 16, part C, (3,6,9-trioxaundecamethylene)bis[tert-butylcarbamoyl chloride] was heated to give 3,6,9-trioxaundecamethylene diisocyanate.

EXAMPLE 22

Part A.—N-butyl-tert-butylamine n-Butyl chloride (92.5 g.; 1.0 mole) was added to a solution of tert-butylamine (80.3 g.; 1.1 mole) in 250 ml. of dimethyl-formamide. The resulting mixture was refluxed for about 26 hours. Excess tert-butylamine was removed by distillation, and the residual reaction mixture was cooled to about 10° C. The precipitate which formed was filtered to give 113 g. of N-butyl-tert-butylamine hydrochloride; M.P. 191–195° C. Evaporation of the filtrate to about 100 ml., followed by cooling and filtration gave an additional 48 g. of the same material. The total yield of N-butyl-tert-butylamine was 97%.

The N-butyl-tert-butylamine free base was obtained in 85% yield by treatment of the hydrochloride with 20% aqueous sodium hydroxide solution as in Example 1, part A, followed by drying with solid potassium hydroxide and distillation; B.P. 83° C. at 140 mm.; $n_d^{22.7}$ 1.4086.

Part B.—Butyl-tert-butylcarbamoyl chloride

A solution of N-butyl-tert-butylamine (12.9 g.; 0.1 mole) and triethylamine (10.1 g.; 0.1 mole) in 25 ml. of benzene was added dropwise with stirring at 5° to 15° C. to a solution of phosgene (10.0 g.; 0.1 mole) in 75 ml. of benzene during 10 minutes. The reaction mixture was stirred for an additional 15 minutes. The solid which precipitated was filtered, washed with benzene, and dried to give 13.5 g. of triethylamine hydrochloride; M.P. 195–230° C. The combined benzene filtrate and wash liquid were evaporated to 18.2 g. of a mixture of crystals and oil. The crystals were separated by centrifugation and pressing on porous clay plate to give about 2 g. of N-butyl-tert-butylamine hydrochloride; M.P. 188–191° C. The pale yellow oil (16.6 g.; 86% yield) was butyl-tert-butylcarbamoyl chloride.

Part C.—Butyl isocyanate

These experiments were designed to demonstrate the influence of various solvents on the rate of transformation of butyl-tert-butylcarbamoyl chloride to butyl isocyanate. No attempt was made to isolate the latter.

Solutions of 2.0 g. of butyl-tert-butylcarbamoyl chloride in 38.0 g. of each of the following solvents were prepared: nitrobenzene, toluene, and 1,2-dichloroethane. To the latter solution was also added about 3 mg. of hydrated ferric chloride. The infrared absorption at $5.75\mu$ is characteristic of carbamoyl chloride. The nitrobenzene solution was placed in a bath at 100° C., and the absorption at $5.75\mu$ was measured at the following times: 8, 38, and 65 minutes. The absorption indicated 80%, 36%, and 23% carbamoyl chloride, respectively, at these three times. The toluene solution was placed in a bath at 100° C., and the absorption at $5.75\mu$ was measured at the following times: 8 and 38 minutes. The absorption indicated 99 and 95% carbamoyl chloride, respectively, at these two times. The 1,2-dichloroethane solution was placed in the bath at 100° C.; the reflux temperature was 83° C. Absorption at $5.75\mu$ was measured at the following times: 5, 35, 65, and 115 minutes. The absorption indicated 98%, 56%, 23%, and 6% carbamoyl chloride at these four times.

Although butyl isocyanate was not isolated from these reaction mixtures, absorption at $4.45\mu$, characteristic of isocyanate, was measured along with each measurement at $5.75\mu$. Each absorption at $4.45\mu$ indicated that butyl isocyanate was the main decomposition product.

Part D.—Butyl isocyanate

Gaseous phosgene (15 g.; 0.15 mole) was added beneath the surface of 50 ml. of o-dichlorobenzene at $-15°$ to $-5°$ C. A solution of tert-butylbutylamine (19.4 g.; 0.15 mole) and tributylamine (27.7 g.; 0.15 mole) in 40 ml. of o-dichlorobenzene was then added dropwise during 10 minutes at $-5°$ to 0° C. This solution was rinsed in with another 10 ml. of o-dichlorobenzene. The flask containing the clear, pale yellow reaction mixture was then equipped with a water-cooled (10° to 15° C.) condenser terminating in a trap cooled with solid carbon dioxide. The reaction mixture was heated with stirring during 20 minutes to 125–130° C., and was kept there for one hour. Then the mixture was gradually heated to 145° C. during a second hour. At the end of this time, the trap contained 9 g. of isobutylene, and traces of phosgene and hydrogen chloride.

The reaction mixture, presumably containing butylcarbamoyl chloride, was then cooled to 90° C., and additional tributylamine (27.7 g.; 0.15 mole) was added dropwise during 10 minutes, thereby causing the reaction temperature to rise to 100° C. The reflux condenser was replaced with a distillation column and the reaction mixture was slowly distilled at a flask temperature 153° to 190° C. during 3 hours. Distillate was collected up to 135° C., giving 14.6 g. of a mixture of butyl isocyanate and o-dichlorobenzene containing traces of butylcarbamoyl chloride. Infrared analysis at $4.45\mu$ indicated that this distillate contained 88.5% butyl isocyanate which corresponds to 12.9 g. (87% yield).

EXAMPLE 23

Part A.—N-tert-butyl-2-octylamine

Following the procedure of Example 22, part A, 2-octyl bromide was reacted with tert-butylamine to give N-tert-butyl-2-octylamine.

Part B.—2-octyl isocyanate

Following the procedure of Example 22, part D, N-tert-butyl-2-octylamine was reacted with phosgene and then heated to give 2-octyl isocyanate.

EXAMPLE 24

Part A.—N-tert-butyl(cyclohexylmethyl)amine

Following the procedure of Example 22, part A, cyclohexylmethyl chloride was reacted with tert-butylamine to give N-tert-butyl(cyclohexylmethyl)amine.

Part B.—Cyclohexylmethyl isocyanate

Following the procedure of Example 22, part D, N-tert-butyl(cyclohexylmethyl)amine was reacted with phosgene and then heated to give cyclohexylmethyl isocyanate.

EXAMPLE 25

Part A.—N-tert-butyl(3-cyclopentenylmethyl)amine

Following the procedure of Example 22, part A, 3-cyclopentenylmethyl chloride was reacted with tert-butylamine to give N-tert-butyl(3-cyclopentenylmethyl)amine.

Part B.—3-cyclopentenylmethyl isocyanate

Following the procedure of Example 22, part D, N-tert-butyl(3-cyclopentenylmethyl)amine was reacted with phosgene and then heated to give 3-cyclopentenylmethyl isocyanate.

EXAMPLE 26

Part A.—N-tert-butylcyclopentylamine

Following the procedure of Example 22, part A, cyclopentylbromide was reacted with tert-butylamine to give N-tert-butyl-cyclopentylamine.

Part B.—Cyclopentyl isocyanate

Following the procedure of Example 22, part D, N-tert-butylcyclopentylamine was reacted with phosgene and then heated to give cyclopentyl isocyanate.

We claim:

1. A process for preparing an organic isocyanate, which comprises heating a secondary carbamoyl chloride reactant containing at least one moiety with the formula:

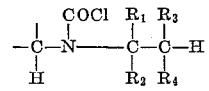

wherein $R_1$ and $R_2$ are lower alkyl, and wherein $R_3$ and $R_4$ are selected from the group consisting of hydrogen and lower alkyl, in the range 50° to 250° C., to form said organic isocyanate.

2. The process of claim 1 wherein said moiety has the formula:

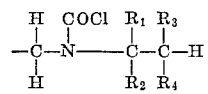

3. The process of claim 1 wherein said heating is carried out in the presence of an inert solvent.
4. The process of claim 1 wherein said heating is carried out in the presence of a tertiary amine selected from the group consisting of trialkylamines, heterocyclic amines, and aromatic amines.
5. The process of claim 1 wherein said heating is carried out in the presence of a Lewis acid.
6. The process of claim 1 wherein $R_1$ and $R_2$ are methyl, and wherein $R_3$ and $R_4$ are hydrogen.
7. The process of claim 1 wherein said secondary carbamoyl chloride reactant contains one moiety with said formula.
8. The process of claim 1 wherein said secondary carbamoyl chloride reactant contains two moieties with said formula.
9. A process for preparing an organic isocyanate, which comprises the steps, (1) mixing phosgene and a secondary amine reactant containing at least one moiety with the formula:

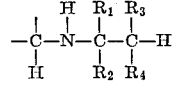

wherein $R_1$ and $R_2$ are lower alkyl, and wherein $R_3$ and $R_4$ are selected from the group consisting of hydrogen and lower alkyl, and (2) heating the secondary carbamoyl chloride product from step (1) in the range 50° to 250° C., to form said organic isocyanate.

10. The process of claim 9 wherein said moiety is the sole moiety reactive with phosgene.

11. The process of claim 9 wherein said moiety has the formula:

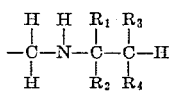

12. The process of claim 11 wherein said moiety is the sole moiety reactive with phosgene.

13. The process of claim 9 wherein the secondary carbamoyl chloride product from step (1) is heated in the presence of an inert solvent.

14. The process of claim 9 wherein the secondary carbamoyl chloride product from step (1) is heated in the presence of a tertiary amine selected from the group consisting of trialkylamines, heterocyclic amines, and aromatic amines.

15. The process of claim 9 wherein the secondary carbamoyl chloride product from step (1) is heated in the presence of a Lewis acid.

16. The process of claim 9 wherein $R_1$ and $R_2$ are methyl, and wherein $R_3$ and $R_4$ are hydrogen.

17. The process of claim 9 wherein said secondary amine reactant contains one moiety with said formula.

18. The process of claim 9 wherein said secondary amine reactant contains two moieties with said formula.

References Cited by the Examiner

UNITED STATES PATENTS

| | | | |
|---|---|---|---|
| 2,326,229 | 9/1943 | Kharasch et al. | 260—544 |
| 2,773,086 | 12/1956 | Slocombe et al. | 260—453 |
| 2,855,421 | 10/1958 | Bunge et al. | 260—543 |
| 3,020,313 | 2/1962 | Aulbaugh et al. | 260—544 |

OTHER REFERENCES

Reetz et al.: Journal of the American Chemical Society, 1955, volume 77, pp. 3812–3816, QD1A5.

CHARLES B. PARKER, *Primary Examiner.*

DALE R. MAHANAND, *Assistant Examiner.*